Nov. 29, 1960
E. ROLF
2,962,650
CONTROL SYSTEM FOR CONTACT CONVERTERS
Filed Feb. 27, 1956
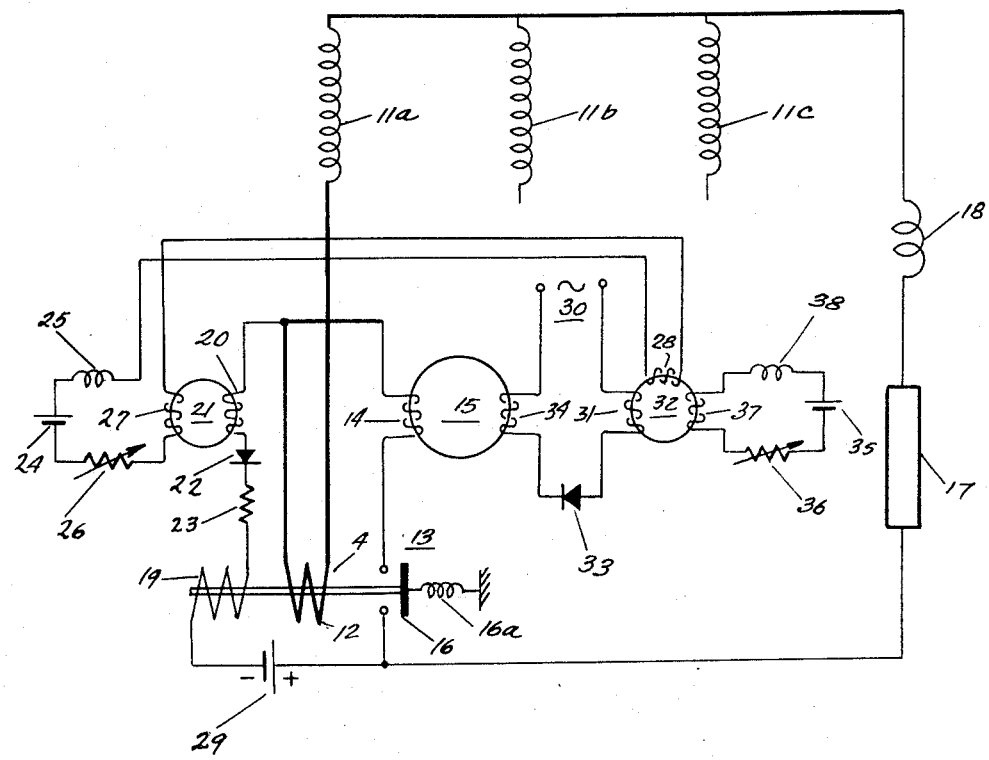
INVENTOR.
ERICH ROLF
BY
Ostrolenk, Faber,
Gerb & Soffen
ATTORNEYS United States Patent Office 2,962,650
Patented Nov. 29, 1960

1

2,962,650

CONTROL SYSTEM FOR CONTACT CONVERTERS

Erich Rolf, Nurnberg, Germany, assignor to Siemens-Schuckertwerke A.G., Berlin, Germany, a corporation of Germany Filed Feb. 27, 1956, Ser. No. 568,083

8 Claims. (Cl. 321—48)

My invention relates to a means to regulate the output voltage of a contact rectifier by utilizing both mechanical and magnetic control.

Mechanical and electromagnetic rectifiers such as the rectifier described in copending application Serial No. 331,467, filed January 15, 1953, now Patent No. 2,759,-141, may have their output voltage regulated by varying the point at which a contact closes to connect an A.-C. source to a D.-C. load.

As the delay time for closing the contact is increased, however, the instantaneous voltage appearing across the contact is increased and for a large degree of regulation, the instantaneous voltage appearing across the contacts at the make, may be large enough to cause contact destruction after a relatively short time.

Another system for regulating the output voltage of a mechanical or electromagnetic rectifier is the magnetic control system or so called flux reversal system wherein the step length or period of unsaturation of a saturable type reactor connect in series when the contact is made variable. In this case, the contact is always closed when the voltage thereacross is substantially zero and the saturable reactor unsaturates to absorb the voltage of the A.-C. source for a predetermined length of time to thereby adjust the amount of voltage transferred to a D.-C. load.

In order to increase the regulation (decrease the output voltage) in a magnetic control system, it is seen that the saturable reactor, commonly known as a commutating reactor, must be made larger to thereby absorb a greater number of volt seconds prior to saturation thereof, and increase the delay in the transference of the A.-C. voltage to the D.-C. load. This increase in size, however, introduces undesirable electrical characteristics in the reactor, such as increased leakage reactance, increased resistance and may be economically prohibitive.

The principle of my invention is to utilize the features of both mechanical and magnetic regulation system, wherein a relatively small commutating reactor is utilized for relatively small amounts of voltage regulation and when a degree of regulation which may not be obtained from the commutating reactor available is desired, to then utilize mechanical regulation by advancing the point at which contact make occurs.

Hence, when a relatively high degree of regulation is desired, a first portion of this regulation is obtained by mechanical means, or advancement of the contact make point and after contact closure to utilize the magnetic control available in the commutating reactor.

It is therefore seen that with my novel combination of both mechanical and magnetic voltage control, that the instantaneous voltage appearing across the contacts is relatively small in view of the relatively small degree of mechanical regulation utilized, and similarly that a relatively small commutating reactor may be utilized in view of the relatively small degree of magnetic regulation needed.

2

I can further provide that both the magnetic and mechanical regulation be controlled from a common control means whereby the adjustment of a single controlling component can automatically adjust the degree of mechanical and magnetic regulation required for a given output voltage.

Accordingly, the primary object of my invention is to provide a combination of both mechanical and magnetic voltage control in a contact converter.

Another object of my invention is to decrease the instantaneous make voltage on a contact converter and to decrease the size of the commutating reactor by providing a regulation system comprised of both mechanical and magnetic means.

Another object of my invention is to provide voltage regulation of both the magnetic type and the mechanical type for a contact converter wherein the adjustment means is comprised of a single component.

Still another object of my invention is to vary the point at which energy is interchanged between an A.-C. system and a D.-C. system.

These and other objects of my invention will become apparent when taken in conjunction with the drawing.

In the drawing, the single figure shows a schematic diagram of a contact converter of the electromagnetic type which is adapted to have magnetic or flux reversal control as well as a regulating means which varies the point of contact closure.

More specifically, the single figure shows a three-phase A.-C. source comprising the transformer windings 11a, 11b and 11c wherein the circuitry associated with the phase including transformer winding 11a is shown and the circuitry for control phases 11b and 11c is now shown, since they will be identical with that shown in phase 11a.

Winding 11a is shown as being connected in series with holding winding 12 of the electromagnetic switch seen generally at 13. Winding 12 is in turn connected in series with winding 14 of the commutating reactor seen generally at 15, contact 16 of the electromagnetic switch 13, D.-C. load 17 and a smoothing choke 18. Contact 16, which is biased to a disengaged position by a biasing means 16a (which could be of any desired type) is constructed to be movable into and out of engagement responsive to a magnetic field. Clearly, when contact 16 of the electromagnetic switch 13 is in its engaged position and the commutating reactor 15 is saturated, the voltage of winding 11a will appear across the D.-C. load 17. By synchronously operating contact 16 into and out of engagement with the frequency of the A.-C. source, it is then clear that an average voltage will appear on load 17.

It is further seen that during the flow of load current, the holding winding 12, which is so constructed as to provide a magnetic field for maintaining the contact 16 in engagement, will serve to maintain contact engagement while load current flows through holding coil 12.

An operating winding 19 is then provided and is so constructed that upon energization thereof, a magnetic field will be created to initiate the contact engagement of the contact 15. Therefore, if the point of energization of operating winding 19 is varied, the point of contact engagement of contact 16 may be varied to thereby affect voltage regulation of the voltage transferred from the A.-C. winding 11a to the D.-C. load 17.

The circuit for energizing the operating winding 19 is seen as including winding 20 of saturable reactor 21, the diode 22 and a resistor 23. This circuit, however, will conduct appreciable current (in the direction of diode 22) only when the saturable reactor 21 is in its unsaturated condition.

To afford control of the point at which saturable reactor 21 saturates, and hence the point at which winding 19 is energized, the reactor 21 is provided with a variable D.-C. bias circuit, comprised of the D.-C. source 24, stabilizing choke 25, variable resistor 26, control winding 27 and winding 28. By varying the resistance of resistor 26, the D.-C. bias of winding 27 is varied to thereby vary the number of volt seconds required at winding 20 to saturate the core of saturable reactor 21. Hence, if the D.-C. bias 27 is relatively low, a relatively small number of volt-seconds is required at winding 20 to saturate reactor 21, which means that saturation of the saturable reactor 21 is affected in a short time and winding 19 will be energized to effect contact closure of contact 16 after a relatively short interval of time. Hence, the output voltage regulation due solely to control of the contact closure time, is relatively small and a large voltage will appear across the D.-C. load 17 in the absence of further regulating means.

If desired, the point of contact closure of contact 16 may be advanced by means of the biasing circuit containing D.-C. source 29.

In accordance with my novel invention a second mode of voltage control or magnetic voltage control is introduced. That is to say, after contact closure, of contact 16, the time at which voltage may be transferred from winding 11a to the D.-C. load 17 may be further delayed by maintaining the commutating reactor 15 in an unsaturated state for a predetermined length of time. In this case, the voltage will fall across commutating reactor 14 instead of the D.-C. load 17, until the commutating reactor 15 is saturated. To control the length of time of unsaturation of the commutating reactor 15, a flux reversal control circuit including the A.-C. source 30, winding 31, of the transductor or saturable reactor shown generally at 32, rectifier 33 and flux reversal winding 24.

Transductor 32 is provided with a D.-C. control circuit comprising D.-C. source 35, adjustable resistor 36, winding 37 and stabilizing choke 38.

The operation of the flux reversal circuit is based on a means to vary the number of volt seconds appearing on the flux reversal winding 34, which is so wound as to drive the magnetic flux of the commutating reactor 15 in a direction opposite to the direction in which it will be driven by winding 14 upon contact closure of the contact 16. If, then, a larger amount of flux is reversed by the coil 34, the subsequent length of time required for a voltage appearing on the winding 14 to saturate the reactor 15 will be relatively large and a larger degree of voltage regulation will be experienced by the load 17.

A variation in the number of volt seconds applied to coil 34 may be had by varying the D.-C. bias applied to winding 37 of the saturable reactor 32, which in turn adjusts the total number of volt-seconds appearing on winding 31 before saturation of its associated magnetic core. Hence, the voltage of the source 30 will appear on winding 31 for a relatively long time, if a relatively large amount of flux is to reverse in reactor 32 and after saturation of reactor 32, the remaining voltage of A.-C. source 30 then appears across the coil 34. Thus, the degree of flux reversal of the commutating reactor 15 is seen to be controlled by the degree of flux reversal of saturable reactor 32, which in turn is adjusted by the D.-C. bias of coil 37.

If the D.-C. winding 28 of core 32, which couples the flux reversal circuit and the contact closure delay circuit were to be removed, then operation of the voltage control system could proceed with individual adjustment of the degree of individual flux reversal and contact delay contributed by each of the respective circuits. That is to say, an adjustment of the resistor 26 would determine the degree of delay of contact closure of contact 16 and adjustment of the resistor 36 would determine the length of unsaturation of the commutating reactor 15 after contact closure of the contact 16.

By providing the coil 28, however, it is now necessary to adjust only adjustable resistor 26, to thereby effect a change in both the point of contact closure and the degree of flux reversal for the commutating reactor 15. If, for example, it is desired to decrease the voltage appearing across the D.-C. load 17, the D.-C. control current in coil 27 and hence, the current in coil 28 is increased by decreasing the resistance of resistor 26. This increase in current in coil 27 would call for an increase in the time taken to saturate a saturable reactor 21 by means of voltage appearing on coil 20, to thereby delay the point of contact closure of contact 16, thus contributing a portion of the required decrease in voltage for the D.-C. load 17. Similarly, the increase in current in coil 28, which is so wound as to oppose the action of winding 37, will cause saturable reactor 32 to saturate sooner by means of the voltage appearing on winding 31, to thereby affect an increase in flux reversal at winding 34. This in turn will require the voltage of winding 11a to appear on winding 14 for a longer time, in order to saturate the core of commutating reactor 15, thereby effecting a decrease in output voltage on load 17 due to magnetic control.

It is important to note from the foregoing description, that voltage control due to a variation in the contact closure point was only a portion of the total voltage control effected and that the instantaneous voltage appearing on contact 16 would be accordingly smaller than if the complete voltage control had been effected by this contact time delay. Similarly, it is to be noted, that the voltage control effected by the length of time taken to saturate the commutating reactor 15 was relatively small when compared to the time that would have been required to effect the complete voltage control by this reactor and that its size may be decreased accordingly.

The preceding description has been based on a contact converter in which the contacts are operated by an electromagnetic operating means. In the event that a synchronous motor or similar device is utilized to drive the cooperating contacts into and out of engagement, it is clear that my novel system could be so adapted that the equivalent of the current in coil 19 of Figure 1, could be utilized to effect phase shift between the stator and rotor of the motor to thereby vary the point of contact closure.

In the foregoing, I have described my invention solely in connection with specific illustrative embodiments thereof. Since many variations and modifications of the invention will now be obvious to those skilled in the art, I prefer to be bound not by the specific disclosure herein contained but only by the appended claims.

I claim:

1. In a contact converter for energizing a D.-C. load from an A.-C. source; a commutating reactor and contact means connected in series with said A.-C. source and said D.-C. load; said contact means being constructed for synchronously opening and closing the series connection of said A.-C. source, D.-C. load and commutating reactor; a first and second regulating means; said first regulating means being constructed to adjustably vary the point of contact closure of said contact; said second regulating means being constructed to adjustably vary the point at which said commutating reactor saturates after contact closure of said contact means.

2. In a contact converter for energizing a D.-C. load from an A.-C. source; a commutating reactor and contact means connected in series with said A.-C. source and said D.-C. load; said contact means being constructed for synchronously opening and closing the series connection of said A.-C. source, D.-C. load and commutating reactor; a first and second regulating means; said first regulating means being constructed to adjustably vary the point of contact closure of said contact; said second regulating means being constructed to adjustably vary the point at which said commutating reactor saturates after contact closure of said contact means; an adjusting means; said adjusting means being constructed to adjustably vary both of said first and second regulating means.

3. A contact converter for synchronously connecting an A.-C. system and a D.-C. system; said converter comprising a pair of cooperable contacts, means for operating said cooperable contacts into and out of engagement with one another and a commutating reactor; said commutating reactor comprising a magnetic core of saturable type material and a main winding wound thereon; said A.-C. system, cooperable contacts, commutating reactor main winding and D.-C. system being connected in series; a first and second means to vary the point at which energy is exchanged between said A.-C. system and said D.-C. system; said first means being constructed to adjustably vary the point at which said pair of cooperable contacts are engaged; said second means being constructed to adjustably vary the point at which said commutating reactor saturates after contact engagement of said cooperable contacts.

4. A contact converter for synchronously connecting an A.-C. system and a D.-C. system; said converter comprising a pair of cooperable contacts, means for operating said cooperable contacts into and out of engagement with one another and a commutating reactor; said commutating reactor comprising a magnetic core of saturable type material and a main winding wound thereon; said A.-C. system, cooperable contacts, commutating reactor main winding and D.-C. system being connected in series; a first and second means to vary the point at which energy is exchanged between said A.-C. system and said D.-C. system; said first means being constructed to adjustably vary the point at which said pair of cooperable contacts are engaged; said second means being constructed to adjustably vary the point at which said commutating reactor saturates after contact engagement of said cooperable contacts; a common adjusting means; said common adjusting means being adapted to control the adjustment of both of said first and second means.

5. In an electromagnetic rectifier for energizing a D.-C. load from an A.-C. source; a commutating reactor having a core of saturable type material and a contact means movable into and out of engagement responsive to a magnetic field; said commutating reactor having a main winding and a flux reversal winding; said D.-C. load, A.-C. source, contact means and commutating reactor main winding being connected in series; an operating winding and circuit connections adapted for effecting energization of said operating winding; said operating winding being constructed to create a magnetic field to move said contact means to engagement responsive to energization of said operating winding; a first means to variably adjust the point of energization of said operating winding to vary the point of contact closure and a second means connected to said flux reversal winding to variably adjust the degree of unsaturation of said commutating reactor core at the point of contact engagement.

6. In an electromagnetic rectifier for energizing a D.-C. load from an A.-C. source; a commutating reactor having a core of saturable type material and a contact means movable into and out of engagement responsive to a magnetic field; said commutating reactor having a main winding and a flux reversal winding; said D.-C. load, A.-C. source, contact means and commutating reactor main winding being connected in series; an operating winding and circuit connections adapted for effecting energization of said operating winding; said operating winding being constructed to create a magnetic field to move said contact means to engagement responsive to energization of said operating winding; a first means to variably adjust the point of energization of said operating winding to vary the point of contact closure and a second means connected to said flux reversal winding to variably adjust the degree of unsaturation of said commutating reactor core at the point of contact engagement; and a common control means for controlling the operation of both of said first and second means.

7. A regulating means for contact converters having a series connected contact device and saturable type reactor; said regulating means comprising a first means constructed to vary the point of contact engagement of said contact device and a second means to vary the degree of unsaturation of said saturable type reactor prior to said contact closure.

8. A regulating means for contact converters having a series connected contact device and saturable type reactor; said regulating means comprising a first means constructed to vary the point of contact engagement of said contact device and a second means to vary the degree of unsaturation of said saturable type reactor prior to said contact closure; said first and second means having a common control means.

References Cited in the file of this patent

UNITED STATES PATENTS

| | | |
|---|---|---|
| 2,181,152 | Rolf | Nov. 28, 1939 |
| 2,193,421 | Janetschke | Mar. 12, 1940 |
| 2,225,644 | Koppelmann | Dec. 24, 1940 |
| 2,227,937 | Koppelmann | Jan. 7, 1941 |
| 2,276,784 | Koppelmann | Mar. 17, 1942 |
| 2,619,628 | Kesselring | Nov. 25, 1952 |
| 2,756,381 | Rolf | July 24, 1956 |
| 2,777,108 | Read et al. | Jan. 8, 1957 |
| 2,782,359 | Koppelmann | Feb. 19, 1957 |
| 2,811,596 | Favre | Oct. 29, 1957 |
| 2,817,805 | Diebold | Dec. 24, 1957 |
| 2,864,991 | Blatter | Dec. 16, 1958 |